April 11, 1939.                J. H. GRUVER                2,154,381
                              CASH REGISTER
                    Filed Dec. 6, 1935        4 Sheets-Sheet 1

FIG. 1

Inventor
John H. Gruver
By
Earl Benst
His Attorney

April 11, 1939. J. H. GRUVER 2,154,381
CASH REGISTER
Filed Dec. 6, 1935 4 Sheets-Sheet 2

Inventor
John H. Gruver
By
Carl Benst
His Attorney

April 11, 1939.  J. H. GRUVER  2,154,381
CASH REGISTER
Filed Dec. 6, 1935   4 Sheets-Sheet 3

Inventor
John H. Gruver
By Pearl Benst
His Attorney

Patented Apr. 11, 1939

2,154,381

UNITED STATES PATENT OFFICE 2,154,381

CASH REGISTER

John H. Gruver, Dayton, Ohio, assignor to The National Cash Register Company, Dayton, Ohio, a corporation of Maryland Application December 6, 1935, Serial No. 53,128

26 Claims. (Cl. 235—3)

This invention relates to cash registers and accounting machines and is directed particularly to a novel means for feeding record material a different distance during sub-total operations from that which it receives during grand-total operations, and also has means coordinated with the feeding means to control the printing hammers for recording data on such record material.

The invention is shown applied to a machine of the type disclosed in Letters Patent Nos. 1,865,147 and 1,963,733, issued on June 28, 1932, and June 19, 1934, to Bernis M. Shipley and Samuel Brand, respectively. It is to be understood that the invention may be used with any other suitable type of machine, the particular machine illustrated being merely by way of example.

An object of this invention is to provide new and novel means for controlling the feed given to the record material by the feeding mechanism thereof.

A more particular object is to provide means for feeding the record material a short distance during sub-total operations by controlling the feeding mechanism, which feeds the record material a greater distance during grand-total operations.

Another object is to provide means for preventing the issuance of the receipt from the machine when printing thereon a sub-total of an item or plurality of items comprising a transaction, in order that the operator may read such sub-total off the indicators and calculate the tax thereon, and for automatically issuing the receipt from the machine when the grand total for the complete transaction, which includes such tax, is printed thereon.

A further object is to provide means for automatically disabling the special data printing hammers during sub-total operations.

A still further object is to provide means for automatically releasing the special data printing hammers when printing grand totals.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

General Description

Previous to this time, machines of the type herein referred to were only capable of printing on a receipt a single item or a plurality of items comprising a transaction and the total thereof. In other words, these machines were only capable of printing a single total on the receipt, before automatically feeding it from the machine. It was also customary in such machines, when printing the total, to simultaneously therewith print the consecutive number, date and other desired data.

In the many places of business handling taxable goods today it has been found desirable to have such machines print on the receipt, in addition to the items comprising a transaction, a sub-total thereof, the amount of tax to be charged, such tax to be calculated by the operator on the sub-total amount displayed by the indicating mechanism, and the grand total amount for the complete transaction, before the receipt paper is automatically fed from the machine in the form of a receipt to be given to the customer.

In accomplishing the above desired results, it is necessary that the printing hammers which print the consecutive number, date and other desired data, which hammers ordinarily print during total taking operations, be disabled during sub-total operations and then released for operation during grand total operations.

The present invention contemplates means for accomplishing all of the desired results mentioned above, which means will be hereinafter described in detail.

DETAILED DESCRIPTION

Keys and differential mechanism

The keyboard and differential mechanism of the present application is substantially like that shown and illustrated in the previously mentioned Shipley Patent No. 1,865,147, and reference may be made thereto for a complete disclosure and description thereof. Only a brief description of the keyboard and its cooperating mechanism will, therefore, be given herein.

The keyboard (Fig. 3) comprises four banks of amount keys 30, one bank of clerks' keys 31, a bank of transaction or classification keys 32, a starting key 33, and a total lever 34 (Fig. 2) for controlling the machine for sub-total and grand-total taking operations.

Figure 3:
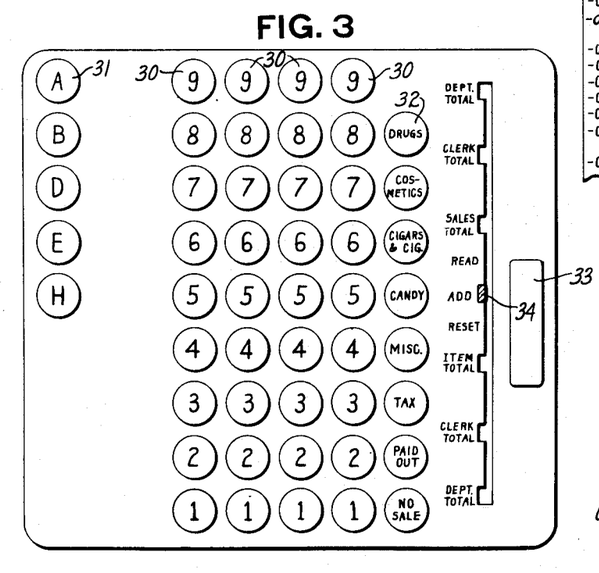
Fig. 3 is a diagrammatic view of the keyboard of the machine.

For the sake of clearness, the captions "Read" and "Reset" on the keyboard illustrated in Fig. 3, which represent the positions to which the total lever 34 is moved for conditioning the machine for total taking operations, will hereinafter be referred to as "sub-total" and "grand-total", respectively.

The bank of transaction keys 32 has associated therewith a differential similar to that hereinafter described in connection with the amount bank of keys 30, except that the teeth thereon are omitted, for setting a type wheel having characters corresponding to these keys to indicate on the receipt and record strip the character of the transaction recorded. The clerks' keys 31 are adapted to directly set a type wheel associated therewith, having characters corresponding to these keys, to print on the receipt and record strip a character indicating the clerk handling the transaction. The total lever 34 sets a special character type wheel associated therewith, when the lever is moved to either its sub-total or grand-total position, to print a character to indicate whether the total printed is a sub-total or a grand total. Since these mechanisms form no part of the present invention, no disclosure thereof is made in this application.

The only differential mechanism described herein is that for one of the banks of amount keys. This differential illustrates the type of machine to which the present invention is applied, and is fully illustrated and described in detail in the above mentioned Shipley Patent No. 1,865,147. Inasmuch as this mechanism is old and well known in the art, only a brief description thereof will be given here.

The keys 30 (Fig. 1) of each amount bank are mounted in an individual frame 35 mounted on rods 36 and 37, carried by the side frames of the machine, only the left-hand side frame 49 being shown. The keys are retained in their normal outer positions by the usual compression springs (not shown). The keys 30 cooperate with a detent 38 supported at its upper end by an arm 39 and at its lower end by an arm 40, which arms are supported on studs in the frame 35. The detent 38 has a pin 41 for each key in its associated bank, and when a key is depressed its associated pin 41 moves the detent downwardly until a shoulder 42 on the key passes the pin 41, whereupon the detent 38 is raised slightly, by a spring 43, one end of which is attached to a stud on an arm 44 secured to a shaft 45, and the other end to a stud on the key frame 35. An arm 46 is also secured to the shaft 45 and has a stud 47 which contacts the arm 40. The spring 43 constantly urges the arms 44 and 46 clockwise and, through the stud 47, urges the arm 40 counter-clockwise to elevate the detent 38. Thus, when a key 30 is depressed, its corresponding stud 41 is moved over the shoulder 42 of the key to retain the key in a depressed position.

Figure 1:
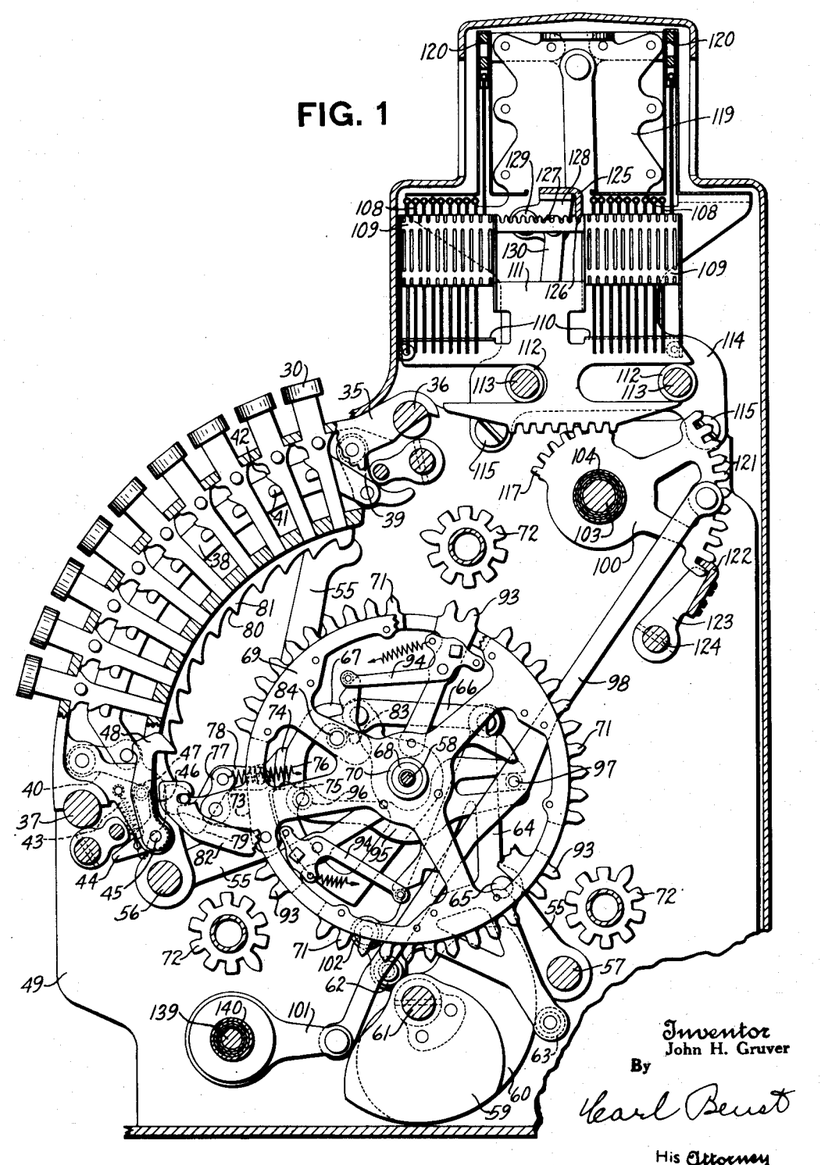
Fig. 1 is a section taken along side of one of the amount banks, showing the mechanism for controlling the indicating mechanism.

When a key is depressed and the arm 40 thereby rocked clockwise, it will, through its engagement with the stud 47, rock a zero stop pawl 48, secured to the shaft 45, counter-clockwise out of the path of movement of the differential mechanism to be hereinafter described, thus permitting the differential latch to contact the inner end of the depressed key and thereby stop the differential mechanism. In this manner the amount keys control the setting of the amount differential mechanism.

There is a differential unit for each of the amount key banks. Each unit is supported by two hangers 55 (only one of which is shown) mounted upon rods 56 and 57. A rod 58 extends through all of the differential units, and acts as a stabilizer for said units.

Each differential unit (Fig. 1) is driven by a pair of cams 59 and 60 fixed on a main operating shaft 61. These cams cooperate with rollers 62 and 63, respectively, on a Y-shaped lever 64 pivoted on a stud 65 on the hanger 55.

The upper end of the lever 64 is connected by a link 66 to a driver 67 loose on a hollow stud 68 fastened in the hanger 55. The clockwise movement of the cams 59 and 60 during an add operation oscillates the lever 64 first clockwise and then counter-clockwise to normal position. This movement, through the link 66, rocks the driver 67 first clockwise and then counter-clockwise to its normal position.

For each unit, there is a differential actuator 69 having a hub 70 journaled on the stud 68. Each differential actuator 69 carries three separate segments 71 which operate totalizer pinions 72 of three totalizer lines in order to register the amount represented by a depressed key in any of the totalizers which may have been selected. The differential actuator 69 is connected to the invariably movable driver 67 by a latch 73 pivoted to said actuator. A foot 74 of the latch 73 is normally held in engagement with the driver 67, above a shoulder 75, by a spring 76. For the purpose of unlatching the latch 73 from the driver 67 there is pivoted on the actuator 69 a bell crank 77, one end of which is pivoted to a link 78. The link 78 is pivoted at one end to the latch 73 while its free end bears the shape of a locking nose 79.

By this latch connection, the actuator 69 and segments 71 are rotated clockwise during an operation of the machine until the free end of the bell crank 77 strikes the end of a depressed key. When this occurs, the bell crank 77 and link 78 are moved counter-clockwise thereby disengaging the foot 74 on the latch 73 from the shoulder 75 on the driver 67. The foot 74 then rides upon the outer peripery of the driver 67 as the driver continues its invariable movement. When the latch is thus disengaged, the nose 79 on the link 78 engages a notch 80, opposite the depressed key, in a latch retaining bar 81 mounted at its lower end on the rod 56 and at its upper end on the hanger 55. There are ten notches 80 in the latch retaining bar 81, one for each of the nine keys in the bank and one at the zero position. When there is no amount key depressed, the latch is disengaged in the zero position by the zero stop pawl 48.

There is provided a reset spider 82 (only a portion of which is shown), which is the usual and well known reset spider for controlling the differential positioning of the actuator 69 during reset operations to set the amount taken from the totalizer wheels on the indicators and the type wheels in the customary manner, as shown in the Shipley Patent No. 1,865,147, above referred to. It is through this means that the sub-total of a plurality of items comprising a transaction is set up on the indicators, thereby displaying to the operator the proper amount upon which the tax is to be computed.

As before mentioned, the present invention provides means for controlling the feed of the receipt paper so that both a sub-total and a grand total may be printed thereon, before it is automatically fed from the machine in the form of a receipt.

It is thus possible for the operator, after a sub-total is printed on the receipt paper and set up on the indicators by means of the reset spider above referred to, to compute the tax on the amount thus displayed by the indicators and enter the proper amount of the tax on the machine, which amount is printed on the receipt paper. A grand total is then taken, which amount is printed on the receipt paper, after which the paper is automatically fed out of the machine in the form of a receipt.

Since the function and operation of the reset spider 82 is fully shown and described in the above mentioned Shipley patent, no further description thereof will be given herein.

When the driver 67 is rotated counter-clockwise to its home position, a shoulder 83 thereon contacts a pin 84 on the actuator 69 and restores it and the segments 71 to their normal positions. The time when the driver 67 contacts the pin 84 varies according to the key which has been depressed. If the "2" key has been depressed, the driver 67 does not contact the pin 84 until near the end of its counter-clockwise movement. However, if the "9" key has been depressed and the latch 73 disengaged at the "9" position, the shoulder 83 immediately contacts the pin 84 upon the return movement of the driver 67, thereby causing a greater rotation of whichever totalizer wheel 72 which has been previously engaged with any one of the segments 71.

The totalizer wheels 72 are rocked into engagement with the segments 71, during adding operations, after the latches 73 have been disengaged from the drivers 67, so that, as the segments 71 are returned to their normal positions, the amounts, as determined by the depressed keys, are accumulated on the totalizer wheels.

In the present machine, totals are taken in accordance with the well known principle that the totalizer wheels 72 should be coupled to the actuator segments 71 at the beginning of their advance movement, so that the arrival of the totalizer wheels at zero will set the actuator segments 71 at positions corresponding with the total standing on the totalizer, whereby the indicating mechanism and the printing devices are set from the segments 71 to indicate and print such total. If the total is to be a grand total, the totalizer wheels are to remain at zero or be cleared, and therefore such wheels would be uncoupled from the actuator segments 71 at the completion of the advance of the latter. If, however, a sub-total is to be taken, the total is to remain in the totalizer and, therefore, the totalizer wheels remain coupled to the actuator segments 71 during the advance and return strokes, so that the total is set up again in the totalizer, after the actuator segments 71 have been set, to indicate and print the total, during their advance strokes. Inasmuch as the mechanism for accomplishing this result is shown and described in the patent to Bernis M. Shipley, No. 1,817,883, issued August 4, 1931, no illustration or detailed description thereof is given herein.

*Differential—transfer or carrying*

The carrying mechanism in this case is identical with the carrying mechanism illustrated and described in the above mentioned Shipley Patent No. 1,865,147. It has been only partially illustrated here and will be but very briefly described.

Associated with each of the segments 71 is a two-toothed segment-arm 93 (Fig. 1) pivoted to the actuater 69. Considering now the segment 71 and segment-arm 93 associated with the upper totalizer line, when the segment 71 is rocked clockwise it closes the gap between itself and the segment-arm 93, thus permitting that segment-arm to be positively coupled to the segment 71 by a lever 94, in a manner fully described in the Shipley Patent No. 1,865,147, above referred to. As the segment 71 is moved counter-clockwise to its home position, if no carry has taken place, the two-toothed segment-arm 93 is stopped in the position shown in Fig. 1 by means not shown. If, however, a carry has taken place, this segment-arm moves one step farther in a counter-clockwise direction before it is stopped, thus causing "one" to be added into the totalizer pinion, in addition to the amount added under the control of the amount keys.

*Differential—beam*

Associated with each differential unit is a beam 95 (Fig. 1) pivoted at 96 to the actuator 69. The beam 95 is slotted to receive a stud 97 on a link 98, tne upper end of which is connected to a segment 100 associated with the indicating mechanism. One segment 100 is mounted on a shaft 103 and the remaining segments for the other differential units are carried by nested sleeves 104. The lower end of the link 98 is pivoted to an arm 101, which is connected to the printing mechanism.

As previously described, the lever 64, through the link 66 and driver 67, drives the actuator 69 until the latch 73 is disengaged from the driver 67, either by the zero stop pawl 48 or the end of a depressed amount key. This movement of the actuator 69 positions the left end of the beam 95 accordingly. The lever 64 carries a roller 102, which, when the lever 64 is rocked clockwise, contacts the under side of the beam 95 and moves the beam 95 about its pivot 96 until its upper edge contacts the hub 70 on the actuator 69, thereby positioning the right end of the beam 95 and, consequently, the link 98, segment 100 and arm 101, to set the indicating mechanism and type wheels according to the value of the key depressed.

Indicators

The indicating mechanism disclosed in connection with the present machine is substantially the same as that fully illustrated and described in United States Letters Patent No. 1,163,748, issued to F. L. Fuller December 14, 1915. Therefore, but a brief description of it will be given herein.

As before mentioned, it is the indicating mechanism that furnishes the operator with the amount upon which the tax is to be computed, such amount being a sub-total of the items comprising the transaction. The operator then calculates the proper tax on such amount, enters the tax on the machine, after which the tax is shown on the indicating mechanism and printed on the receipt paper. A grand total is then taken of the complete transaction and printed on the receipt paper, immediately after which the paper is automatically fed out of the machine in the form of a receipt.

There are two groups of indicators 108 (Fig. 1) for each bank of keys in the machine, one group indicating at the front of the machine and the other group indicating at the back of the machine.

As all of these indicators are similarly mounted, a group associated with one of the amount banks only is illustrated and described herein.

The groups of indicators 108 are carried in a carriage 109 and rest upon ledges 110 of a runner 111 slidably mounted on rollers 112 on rods 113 supported by two frames 114 (only one of which is shown), one at each end of the machine. The frames 114 are secured to the side frames of the machine by screws 115. The runner 111 has teeth 116 meshing with a segment 117 integral with the segment 100 differentially positioned through the link 98 by the differential mechanism. In this manner, the carriage 109, carrying the groups of indicators 108, is differentially positioned to bring any desired indicator 108 into operative relation with an indicator lifting means to be hereinafter described.

As the indication from the back of the machine is the reverse of that looking from the front, all the various groups of front and back indicators cannot be mounted on runners similar to runner 111, but must be carried by separate runners and the back indicators differentially positioned from the segments 117, which operate the corresponding front indicators by the sleeves 104 which carry segments similar to segments 117 in mesh with racks formed in the back indicator runners.

Indicators—lifting mechanism

The indicator lifting mechanism is substantially the same as that shown and described in the above mentioned Fuller Patent No. 1,163,748. After the indicator carriages have been differentially positioned according to the keys depressed, the selected indicators are exposed to view by a frame 119 having projections 120 at the front and back thereof, and adapted to raise the selected indicators to view. Before the carriages 109 are differentially positioned, the indicators exposed during the previous operation are lowered to their normal positions by lowering the frame 119.

Indicators—aligning mechanism

Suitable aligning mechanism is provided for properly aligning the indicators, but inasmuch such mechanism is shown and described in the above mentioned Fuller Patent No. 1,163,748, only a small portion of that mechanism is shown herein. Each of the segments 100 has aligning notches 121 with which cooperates an aligning bar 122 screwed to a pair of arms 123 (only one of which is shown here) pinned on a shaft 124. The shaft 124 is operated by means, not shown here but fully illustrated and described in the above mentioned Fuller patent, to withdraw the aligning bar 122 from the segments 100 so that they may be differentially positioned under the control of the differential mechanism, and then to again engage the bar with the segments to hold them in proper positions until a subsequent operation of the machine.

There is also another aligning mechanism which directly aligns the runners 111 of the indicator carriages 109. This aligner 125 is in the form of an angle-iron. The aligner 125 has a slot in alignment with each runner 111 which guides the runner in its movements, and also has an aligning tooth 126 which cooperates with teeth 127 formed in the runner 111. The aligner 125 is secured to a pair of arms 128 (only one of which is shown) pivoted on studs 129 mounted in the plates 114. Pivoted to the arms 128 are links 130 pivoted to arms (not shown) secured to the shaft 124 which causes the two aligning members to operate in unison.

PRINTING MECHANISM

Type wheel setting

The printing mechanism is located on the left-hand side of the machine proper, as is customary in machines of the type here referred to. A series of nested sleeves 140 (Fig. 1) mounted on a shaft 139, the sleeves being actuated by their associated arms 101 and controlled by the differential mechanism, as previously described, support at their left-hand ends segments 141 (Fig. 9) which mesh with teeth 142 of segment levers 143 freely mounted upon a rod 144 extending between the two machine side frames 49 and the printer side frame 131. The upper ends of the segment levers 143 have teeth 145 meshing with teeth 146 of partial gears 147 secured to nested sleeves 148 (Figs. 6 and 9) on a shaft 149 supported by the machine side frame 49 and printer side frame 131. Secured to the left-hand ends of the sleeves 148 and shaft 149 (Fig. 6) are type printing wheels 155, only one of which is shown. Each type wheel 155 has two sets of type characters to permit impressions being taken from the upper and lower sides of the wheels. The upper set prints upon an issuing receipt 137 and the lower set upon a record strip 138.

Figures 9, 10, 11, 12, 13, 14:
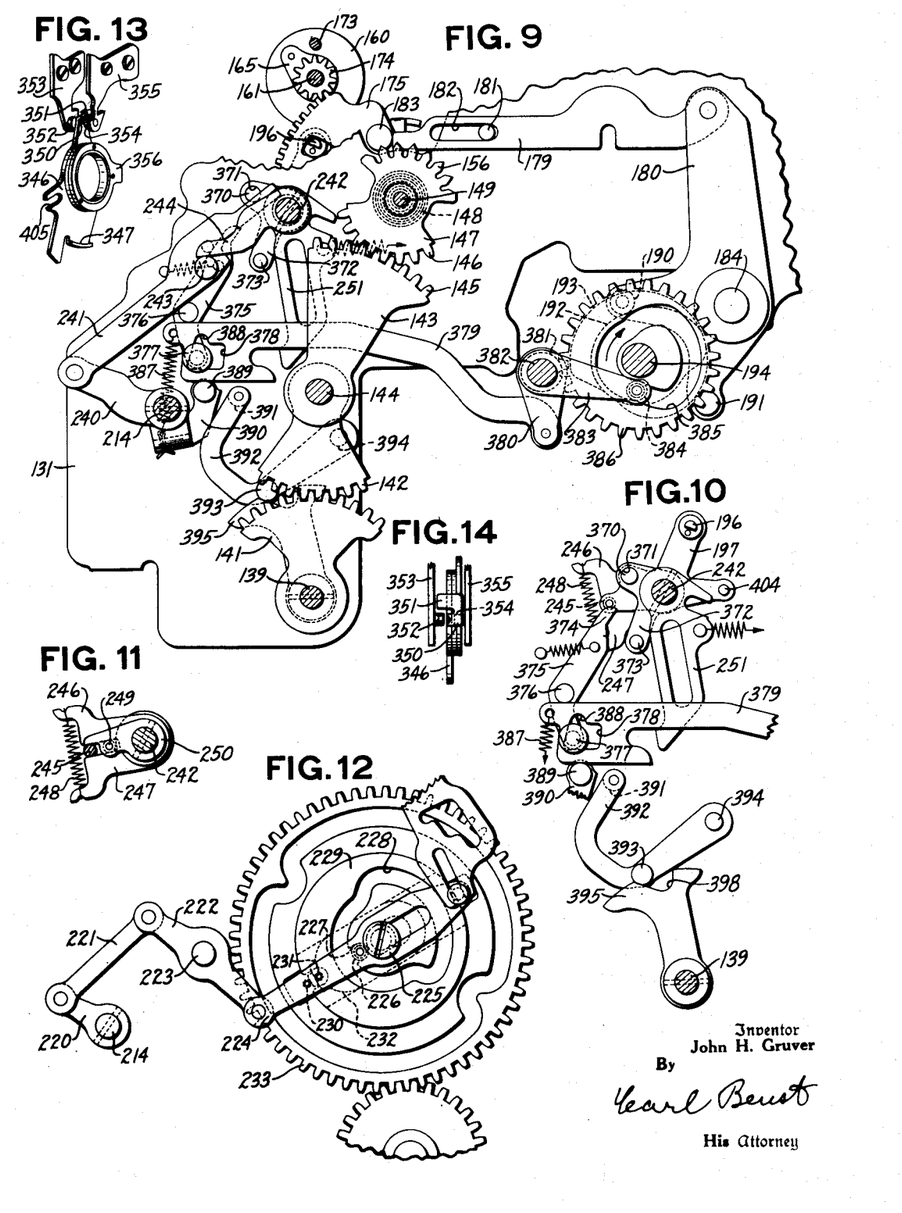
Fig. 9 is a detail side view of the means for altering the control exercised by the mechanism for determining the extent of feed to be given to the receipt paper.
Fig. 10 is a detail side view of the means for controlling the feeding mechanism to feed the receipt paper a short distance during sub-total operations and a longer distance during grand-total operations.
Fig. 11 is a detail side view of the flexible drive for the receipt feeding control member.
Fig. 12 shows a side view of the mechanism for changing the machine from a single cycle to a double cycle operation.
Fig. 13 is a perspective view of the printing hammer control lever and the means by which it disables the upper printing hammers.
Fig. 14 is a top plan view of the flange and its extension on the printing hammer control lever and the studs with which they coact to disable certain of the upper printing hammers.

After the printing wheels 155 are moved to their respective positions, under control of the differential mechanism, they are retained in alignment, at the time the printing takes place, by aligning arms (not shown) which engage the teeth 156 formed on the upper sides of the partial gears 147 (Fig. 9).

Receipt paper

As before mentioned, the present machine is adapted to print and issue a receipt 137 (Figs. 4 and 6) containing the date, consecutive number, amount of each item comprising the transaction, a sub-total thereof, amount of tax charged, grand total for the complete transaction, symbols indicating whether a total is a sub-total or a grand-total, characters representing the class of each item, a letter indicating the clerk handling the transaction, the words "Total shown above" and other selected data.

The receipt paper 137 (Fig. 4) is fed from a supply roll 157 (Fig. 6), carried on a stud 158 supported in the printer side frame 131, around a roller 159, between impression hammers (later described) and the various type wheels 155, between a feed roller 160 and a tension roller and past a severing plate, said tension roller and severing plate not being shown herein, as they are fully illustrated and described in the above mentioned Shipley Patent No. 1,817,883.

Record strip

Figure 5:
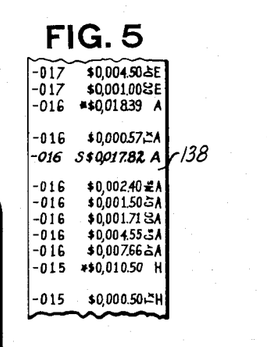
Fig. 5 is a facsimile of a portion of the detail strip printed by the machine.
Figures 6, 7, 8, 15, 16:
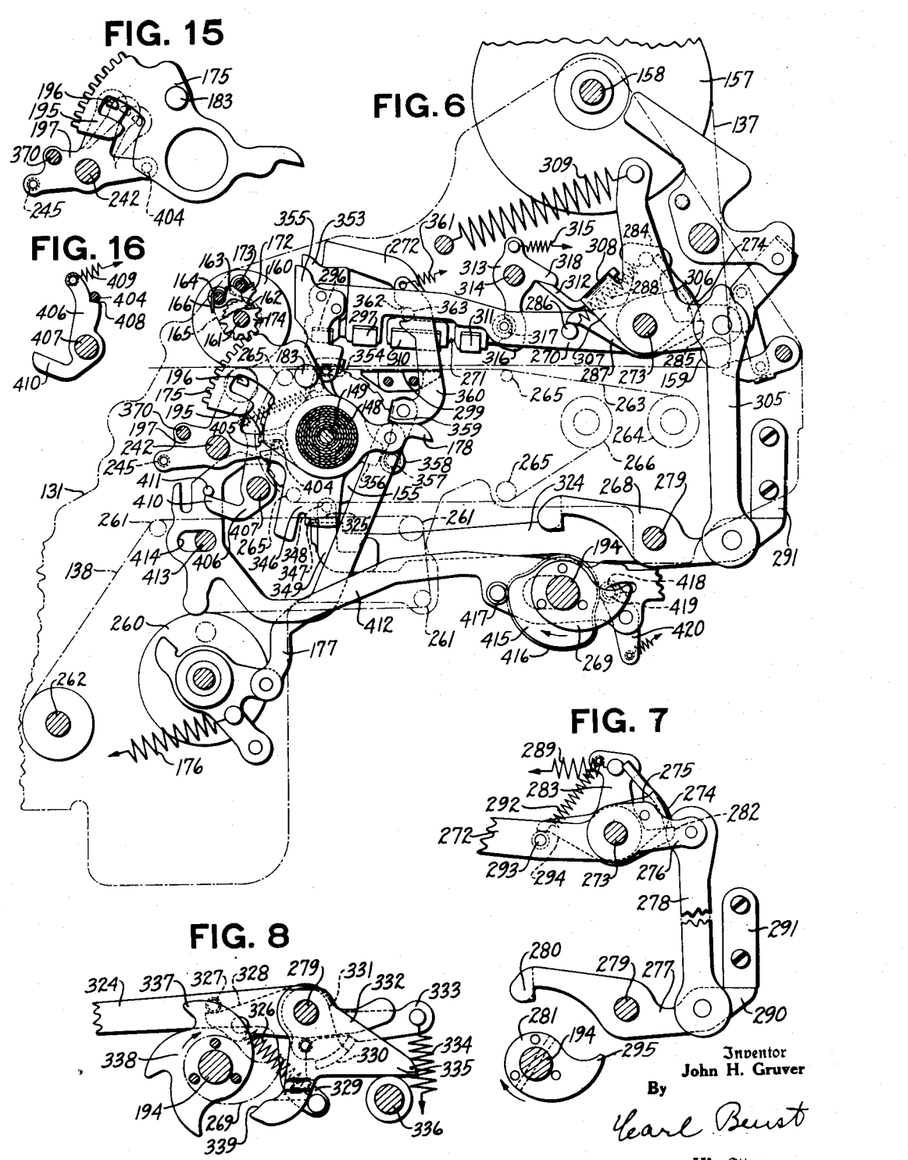
Fig. 6 is a detail side view of the upper printing hammers and the mechanism for controlling the extent of feed given to the receipt paper.
Fig. 7 is a detail side view of a portion of the mechanism for operating the upper printing hammers.
Fig. 8 is a detail side view of the mechanism for operating the lower printing hammer.
Fig. 15 is a detail side view of the gear segment for operating the feeding mechanism for the receipt paper, showing the various positions which the stud assumes for controlling the extent of movement of such gear segment.
Fig. 16 is a detail side view of the latch for holding the hammer control means in a certain one of its moved positions.

In addition to the receipt 137, the machine prints on and retains in the machine a record strip 138 (Figs. 5 and 6). The record strip has printed thereon the amount of each item comprising a transaction, a sub-total thereof, the amount of tax charged, the grand total for the complete transaction, consecutive number, characters representing the class of each item, letter indicating clerk handling the transaction, and symbols indicating whether a total is a sub-total or a grand-total.

The record strip 138 (Fig. 6) is fed from a supply roll 260 around guide rollers 261 and between a lower printing hammer and the type wheels and onto a receiving roll 262, which is rotated in a counterclockwise direction by mechanism not shown here, but fully illustrated and described in the above mentioned Shipley Patent No. 1,865,147.

Ink ribbon

For the purpose of making legible impressions upon the issuing receipts 137 and the record strip 138, an ink ribbon 263 (Fig. 6) is provided. The ink ribbon is fed from a supply roll 264 around guide rollers 265 in a manner to permit impressions being taken from both the upper and lower sets of type characters on the printing wheels 155. The ink ribbon 263 is wound upon a receiving roll 266. Inasmuch as the mechanism for feeding the ink ribbon is not pertinent to the present invention, it will suffice to say that any suitable type of feeding means therefore may be used.

Receipt paper feeding mechanism

As heretofore mentioned, the present invention contemplates feeding the receipt paper 137 in a manner to permit printing thereon an item or plurality of items comprising a transaction, a sub-total thereof, the amount of tax to be charged, and the grand total, together with the consecutive number, date and other desired data, before the receipt is automatically fed from the machine.

In previous machines of the type herein referred to, whenever any kind of total was printed on the receipt, the receipt was immediately thereafter automatically fed from the machine. However, the present invention provides means for feeding the receipt paper in a manner to permit printing of both a sub-total and a grand total on the same receipt, before it is automatically fed from the machine. The feeding mechanism and means for controlling the same for feeding the receipt paper in the above mentioned manner will now be described.

The receipt feed roller 160 (Figs. 6 and 9) is loosely mounted upon a stud 161 supported at one end in the printer frame 131. Secured to the feed roller 160 is a ratchet 162 engaged by a feed pawl 163 freely mounted on a stud 164 carried by an arm 165 loosely mounted upon the stud 161. The pawl 163 is held in contact with the ratchet 162 by a spring 166 and moves the feed roller 160 clockwise to feed the receipt into its various printing positions. A spring actuated pawl 172 (Fig. 6) mounted on a stud 173 prevents retrograde motion of the feed roller 160. Secured to the feed arm 165 and moving freely on the stud 161 is a pinion 174 in mesh with a gear segment 175. This segment is loosely mounted on the type wheel sleeves 148 and is normally urged in a clockwise direction by a spring 176 fast to a link 177 having one end pivoted to a rearwardly extending arm 178 formed on the segment 175.

Clockwise movement of the segment 175 causes it, through the pinion 174 meshing therewith and the arm 165 upon which the pawl 163 is carried, to move the feed roller driving pawl 163 counter-clockwise around the ratchet wheel 163. Then when the segment 175 is moved counter-clockwise to its normal position, against the action of the spring 176, by a horizontally moving slide 179 (Fig. 9), it will cause the pawl 163 to move the feed roller 160 clockwise, thereby feeding the receipt paper 137 a distance corresponding to the counter-clockwise movement of the feed roller driving segment 175. The slide 179 is pivoted at its right-hand end to the upper end of a lever 180 and is guided at its opposite end by a pin 181 projecting from the printer side frame 131 through a slot 182 in said slide. When moving the drive segment 175 counter-clockwise to its normal position, the left-hand end of the slide 179 coacts with a pin 183 on the segment 175. The lever 180 is pivoted on a rod 184 supported by the left side frame 49 of the machine and the printer side frame 131 and has two arms carrying rollers 190 and 191 engaging cams 192 and 193, respectively, secured to a printer drive shaft 194.

During each cycle of operation of the machine, the cams 192 and 193 oscillate the lever 180 to first shift the slide 179 to the right, thereby permitting the segment 175 to be moved clockwise by the spring 176, and then shift the slide 179 toward the left to its normal position, during which movement the end of the slide 179 contacts the pin 183 and moves the feeding roller driving segment 175 counter-clockwise to its home position, as shown in Figs. 6 and 9. Such counter-clockwise movement of the segment 175 causes the pawl 163 to actuate the feed roller 160 clockwise, thereby feeding the receipt paper 137 a distance corresponding to the counter-clockwise movement of the drive segment 175.

Figure 4:
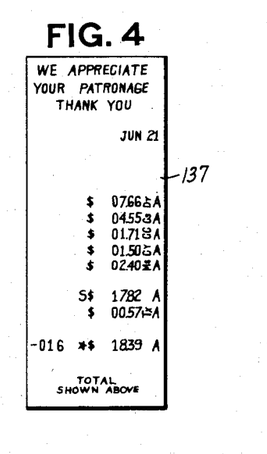
Fig. 4 is a facsimile of the type of receipt issued by the machine.

The printing of items on the receipt during adding operations requires one cycle of operation of the machine, while the printing of any kind of total requires a two-cycle operation. During the first cycle of a two-cycle operation, the receipt paper is given a short feed, and as the total is printed during the second cycle there will be a space between the last item and the total, as shown in Fig. 4.

*Receipt paper feeding mechanism—adding operation*

During each adding operation, the slide 179 through the lever 180 is shifted first to the right and then to the left, as above mentioned. When the slide 179 is moved to the right, the segment 175 is rocked clockwise by the spring 176 until arrested by the inner edge of a projection 195 (Figs. 6, 9 and 15) formed on the segment 175 contacting a half-round stud 196 on an upwardly extending arm of a three-armed lever 197, such stud 196 normally projecting into an opening formed in the segment 175 by the projection 195. The slide 179 then continues to move its full extent to the right, leaving the segment 175 restrained by the stud 196.

After the printing takes place, the slide 179 moves idly toward the left until the end thereof contacts the stud 183 of the segment 175, whereupon continued movement of the slide 179 to the left rocks the segment 175 counter-clockwise until it is returned to its normal position. This counter-clockwise movement of the segment 175 moves the pinion 174 and arm 165 clockwise about the stud 161, and the feed pawl 163 coacts with the ratchet wheels 164 to feed the roller 160 in a clockwise direction, thereby feeding the receipt paper 137 one step of movement. In this manner the receipt paper 137 is fed, during adding operations, one step of movement in order that each item of a multiple-item transaction can be printed in successive order thereon.

*Receipt paper feeding mechanism sub-total operation*

After printing an item or a plurality of items comprising a transaction on the receipt paper 137, it is desired to print and indicate a sub-total thereof, in order that the proper amount of tax to be charged can be calculated from the sub-total amount which is conveniently displayed to the operator on the indicators 108 in the machine. As before mentioned, in previous machines of the type herein referred to, it was impossible to print on the receipt a sub-total, as well as indicate such sub-total amount, and still retain the receipt in the machine for the purpose of subsequently printing thereon the amount of tax calculated on the sub-total amount displayed by the indicators, followed by the printing of the grand total for the complete transaction, after which the receipt is automatically fed out of the machine in the customary manner. The present invention provides means for accomplishing these results, which means will be presently described.

The total lever 34 (Fig. 2) is provided with a slot 203 into which projects a pin 204 on a lever 205 pivoted at 206. Also pivoted at 206 is an arm 207 having a stud 208 which is normally held in contact with the upper end 209 of the lever 205 by a spring 210. The lever 205 and arm 207 together form a slot 211 into which projects a roller 212 on an arm 213 secured to a shaft 214.

Figure 2:
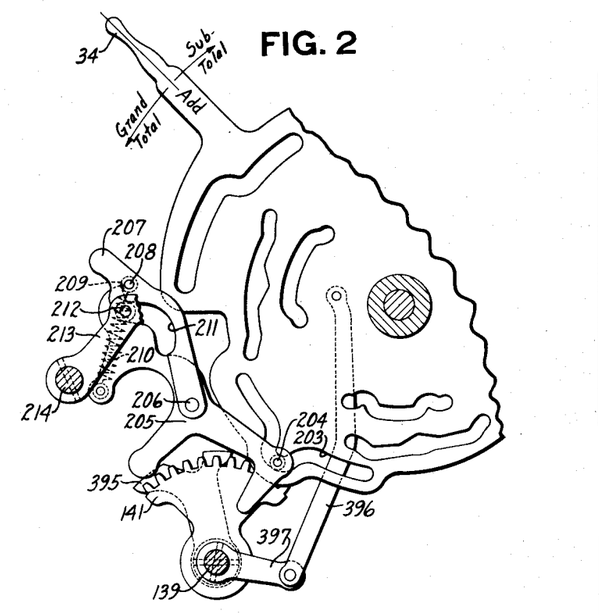
Fig. 2 is a side view of a portion of the total control lever and the means by which it controls the amount of feed to be given to the receipt paper during sub-total and grand-total operations.

In Fig. 2, the total lever 34 is shown in its "add" position. Movement of the lever upwardly to take a sub-total, or downwardly to take a grand-total, through the cam slot 203, lever 205 and arm 207, rocks the arm 213 and consequently the shaft 214 in a clockwise direction. Secured to the shaft 214 (Fig. 12) is an arm 220 connected by a link 221 to a lever 222 pivoted at 223. Connected to the lever 222 is a pitman 224 slotted to surround a screw stud 225 mounted in the right side frame (not shown) of the machine. This pitman carries a roller 226 normally resting in an offset 227 of a cam race 228 in a disk 229. The pitman 224 also has two pins 230 projecting on either side of a flange 231 of a coupling slide 232, which is adapted to couple the cam disk 229 with a gear 233.

The clockwise movement given to the saft 214 by the total lever 34, through the connections shown in Fig. 2, moves the pitman 224 to the left to position the coupling slide 232 so that the cam disk 229 is coupled to the gear 233, in order that they will operate in unison. During either a sub-total or grand total operation, with the cam disk 229 thus coupled to the gear 233 so that they move together as a single unit, the shaft 214 will receive a further clockwise movement near the end of the first cycle of operation of the machine to effect the release of certain of the printing hammers and move the stud 196 (Fig. 15) out of the opening in the segment 175, thus freeing the segment 175 to be rocked clockwise to its fullest extent by the spring 176. The manner in which the shaft 214 performs such results will now be described.

When the total lever 34 is moved from its "add" position to either a sub-total or grand total position, it moves the shaft 214 slightly clockwise, as previously described. When this occurs, an arm 240 (Fig. 9) fast on the shaft 214 moves a slide 241 supported at its free end by a printer control shaft 242. This slide 241 carries a roller 243 which coacts with an arm 244 fast on the printer control shaft 242 and moves the latter slightly clockwise. It is thus obvious that any clockwise movement given to the shaft 214 is, through the train of mechanism just described, transmitted to the printer control shaft 242.

The three-armed lever 197, heretofore referred to, loosely mounted on the shaft 242 controls, through its stud 196, the extent of movement given to the segment 175 by the spring 176, which segment actuates the feed roller 160 to feed the receipt paper various distances, depending upon the extent of movement given to the segment 175. Whenever the printer control shaft 242 is rocked clockwise, the three-armed lever 197 is, by means to be presently described, rocked likewise.

A stud 249 (Fig. 11) on an arm 250 fast to the shaft 242 projects between a pair of arms 246 and 247 journaled on the shaft 242 and pressed against the stud 249 by a spring 248. A stud 245 (Figs. 10 and 11) on the three-armed lever 197 also projects between the arms 246 and 247. Clockwise movement of the shaft 242 and the arm 250 is transmitted by the stud 249 to the arm 246, thence through the spring 248 to the arm 247, which contacts the stud 245 to rock the three-armed lever 197 clockwise. A spring actuated arm 251 fast to the shaft 242 serves to rock the shaft 242 counter-clockwise near the end of the second cycle of operation and, through the flexible drive connections 246—247, returns the three-armed lever 197 and its associated parts to their normal positions.

Thus when the total lever 34 is moved from its "add" position to either its "sub-total" or "grand-total" position, it causes the three-armed lever 197, through the train of mechanism above described, to be rocked slightly clockwise. The purpose of this movement is to position the three-armed lever 197 so that it will, through a hammer control lever cooperating therewith, lock all the printing hammers against operation during the first cycle of the two cycle operation necessary for taking any kind of total. When the three-armed lever 197 is rocked clockwise in the manner just described, it moves the stud 196 (Fig. 6) to an intermediate position (shown by dot and dash lines in Fig. 15) near the mouth of the opening in the segment 175. This change in the position of the stud 196 in no way effects its relationship with the segment 175, the stud 196 still limiting the extent of movement of the segment 175 just as it does when it is in its normal left hand position shown in Fig. 15. The hammer control lever with which the three-armed lever 197 cooperates during its initial clockwise movement will be later described.

When the total lever 34 (Fig. 2) is moved to its sub-total taking position the cam disk 229 (Fig. 12), as previously mentioned, is thereby coupled to the gear 233 so that they will operate together and in unison during the operation of the machine. Through such arrangement the shaft 214 receives a further clockwise movement near the end of the first cycle of operation and, through the train of mechanism previously described, rocks the three-armed lever 197 clockwise to its fullest extent into the right hand position shown in Fig. 15. Such movement of the lever 197 carries the stud 196 out of the opening in the segment 175 and clear of the projection 195 formed thereon. With the stud 196 thus moved to its maximum extent, it no longer exercises any restraint over the movement of the segment 175 by the spring 176. It is thus apparent that during the second cycle of the sub-total taking operation, when the slide 179 (Fig. 9) is shifted to the right, the segment 175 under the action of the spring 176 would follow the slide 179 to the fullest extent of its movement unless prevented from such movement. And under such conditions the return movement of the slide 179 to the left, through its contact with the stud 183 would move the segment 175 its full extent counter-clockwise and would cause the feed roller 160 to give the receipt paper 137 a long feed sufficient to feed the receipt paper 137 out of the machine.

However, during sub-total operations it is not desired to give the receipt paper 137 such a long feed in order that the amount of tax and the grand total for the complete transaction may subsequently be printed thereon before its issuance from the machine. Therefore the present invention provides means for returning the stud 196 to its normal left hand position (Fig. 15) in the opening formed in the segment 175 shortly after the beginning of the second cycle of a sub-total operation. With the stud 196 thus returned to its normal position, the extent of feed given to the receipt paper 137 is limited to that which it receives during adding operations. The means for accomplishing this result will now be described.

The three-armed lever 197 which carries the stud 196 also carries a stud 370 (Figs. 9, 10 and 15) projecting through a hole 371 in one of the arms of a bell crank 372 also freely mounted on the shaft 242. The bell crank 372 through the connections 370 and 371 is connected to and moves with the lever 197. When the lever 197 is rocked clockwise near the end of the first cycle of operation, thus carrying the stud 196 out of the opening formed in the segment 175 by the projection 195, the bell crank 372 is likewise rocked clockwise thus placing a stud 373 in the bell crank 372 close to a finger 374 of a lever 375.

Shortly after the beginning of the second cycle of the sub-total operation, the bell crank 372 is rocked counter-clockwise and through the pin 370 the lever 197 is likewise rocked counter-clockwise thus returning the stud 196 to its normal position. The segment 175 is then only capable, during the second cycle of operation, of moving the same extent that it does during adding operations, which results in the receipt paper 137 only being fed a corresponding extent during sub-total operations.

The means for rocking the bell crank 372 counter-clockwise shortly after the beginning of the second cycle of a sub-total operation will now be described. The above mentioned lever 375 is pivoted on a stud 376 carried by the printer side frame 131 and carries a stud 377 projecting through a square opening 378 in the left end of a link 379. The stud 377 is provided with a large head for the purpose of keeping it in the opening 378 in the link 379. The link 379 is pivoted at its right-hand end to an arm 380 on a hub 381 freely mounted on a shaft 382 supported by the machine side frame 49 and the printer side frame 131. Also fast on the hub 381 is an arm 383 carrying a roller 384 cooperating with a raceway 385 in a box cam 386 secured to the printer drive shaft 194. It is thus obvious that during each cycle of operation, the cam 386 is given one complete rotation in a clockwise direction to shift the link 379 first to the left and then back to the right to its normal position.

A spring 387 (Fig. 9) constantly tends to draw the left-hand end of the link 379 downwardly so that a notch 388 in the upper wall of the square slot 378 will engage the stud 377 on the lever 375. However, the link 379 is normally held in an elevated or ineffective position, against the tension of the spring 387, by a roller 289 on a yoked arm 390 integral with the arm 240 secured to the shaft 214. It will be recalled that when the total lever 34 is moved to its sub-total taking position, the shaft 214 is given a slight clockwise movement, which causes the arm 390 to be lowered slightly but not enough to permit the notch 388 in the link 379 to engage the stud 377. Near the end of the first cycle of a sub-total operation, the shaft 214 receives a greater clockwise movement, which causes the arm 390 to withdraw its support from the link 379, thereby freeing the link 379 to the action of the spring 387. It is thus apparent that the link 379 will be drawn downwardly by the spring 387 to permit the notch 388 to engage the stud 377. When the stud 377 is in the notch 388, the link 379, when moved by the cam 385, rocks the lever 375 clockwise, thus causing the finger 374 to contact the stud 373 and rock the bell crank 372 and three-armed lever 197 counter-clockwise, thereby returning the stud 196 to its normal position in the opening formed in the segment 175 to effect a control over the segment 175 to give the strip a short feed only during sub-total operations.

During sub-total operations, it is also necessary that a roller 391 on a lever 392 be moved downwardly to permit the spring 387 to pull the link 379 downwardly into its effective position. This is accomplished by a link 396 and an arm 397 when the total lever 34 is moved to its sub-total taking position, which movement rocks the shaft 139 and a cam arm 398 thereon counter-clockwise to position a notch 399 in the arm 395 directly beneath a roller 393 on the lever 392, thus permitting the lever 392 to be lowered by gravity, so that the link 379 can function as above described.

After the sub-total is set up on the indicators and printed on the receipt 137, the total lever 34 is manually returned to its "add" position, preparatory to printing the tax on the receipt. The operator then calculates the amount of tax on the sub-total displayed on the indicators, after which the tax is added into the machine and printed on the receipt 137 (Fig. 4). During the addition of the tax the receipt paper receives a short feed, the same as in an adding operation.

*Receipt paper feeding mechanism—total operation*

The operator then moves the total lever 34 to its grand-total taking position, preparatory to printing on the receipt the grand total for the complete transaction, together with the consecutive number, date and other desired data, after which the receipt is automatically fed out of the machine.

Movement of the total lever 34 to its grand-total taking position, rocks the cam arm 395 clockwise, thereby camming the lever 392 upward to hold the link 379 in its elevated or ineffective position during such operation. Therefore, since the segment 175 is limited in its movement by the stud 196 to give the receipt paper a short feed during the first cycle of operation, the three-armed lever 197 is rocked clockwise, through the cam disk 229 and gear 233 (Fig. 12), near the end of the first cycle of operation, thereby moving the stud 196 to a position outside the opening in the segment 175, into the right-hand position shown in Fig. 15. The segment 175 thus free of the stud 196, immediately following the printing on the receipt 137 during the second cycle of operation of the grand total, consecutive number, date and other desired data, actuates the feed roller 160 to give the receipt a long feed to place it in position to be taken from the machine by the operator.

*Receipt printing hammers*

There are three impression hammers 270, 271 and 272, for printing the issuing receipt. The hammer 270 prints the consecutive number and the words "Total shown above". The hammer 271 prints the electro wording and the date and the hammer 272 prints the items, sub-total and total. These hammers are all loosely mounted on a stud 273 (Figs. 6 and 7) supported by the printer frame 131. A bail 274 (Fig. 7), extending between two arms 275 (only one of which is shown), on the stud 273, is provided to actuate the hammers. The right-hand arm 275 has secured thereto an arm 276 connected to an operating arm 277 (Fig. 7) by a link 278. The arm 277 is pivoted on a shaft 279 and has a nose 280 cooperating with a cam 281 fast on the printer drive shaft 194.

The bail 274 overlies an arm 282 of a hammer operating lever 283 pivoted on the stud 273. A spring 288 (Fig. 7) is connected to the operating lever 283 and acts to hold the arm 282 against the underside of the bail 274, the bail in turn being limited in its movement by an extension 290 on the lever 277 striking the underside of a block 291 fast to the side of the printer side frame 131. Thus, this block 291 determines the normal position of the lever 277, link 278, arms 276 and 275, bail 274 and operating lever 283.

A spring 292 normally holds a stud 293 on the item printing hammer 272 against the underside of an extension 294 of the operating lever 283.

When the printer drive shaft 194 is rotated clockwise during an operation of the machine (Fig. 7), a lobe 295 on the cam 281 strikes the nose 280 and cams the lever 277 clockwise, and the link 278 rocks the arms 276 and 275 and bail 274 clockwise. Clockwise movement of the bail 274 rocks the lever 283 clockwise and through the spring 292 rocks the hammer 272 clockwise.

During the rotation of the cam 281, when the lobe 295 passes from beneath the nose 280, the lever 277 is rocked rapidly counter-clockwise by the powerful spring 289 until the extension 290 thereon strikes the block 291. The quick counter-clockwise movement of the lever 277 is transmitted to the hammer 272, and the hammer is carried forward on its own momentum, when the lever 277 is stopped by the block 290, thus causing an impression platen 296 (Fig. 6) carried by the hammer 272 to make a printed record on the strip 137 from the type wheels 125. The stopping of the lever 277 also stops the link 278, arms 275, bail 274 and operating lever 283. Movement of the hammer 272 is permitted by the stretching of the spring 292. After the impression is taken, the spring 292 returns the hammer 272 to its normal position, as shown in the drawings.

The printing hammer 270 (Fig. 6) which prints the consecutive number and the words "Total shown above" on the receipt, is actuated by the cam 281 in the same manner as just described for the item printing hammer 272. The hammer 270 has associated therewith an operating lever 284, a rear arm 285 of which cooperates with the bail 274. A stud 286 on the arm 270 is held in contact with an arm 287 of the lever 284 by a spring 288.

Actuation of the bail 274 by the lobe 295 on the cam 281 results in the actuation of the operating lever 284 to cause the hammer 270 to be operated in the same manner as above described for the item hammer 272, thus causing an impression platen 297 carried by the hammer 270 to take an impression from a set of consecutive number printing wheels (not shown) and certain data, namely "Total shown above" from an electroplate 299 supported by the printer frame 131.

However, the hammers 272 and 270 are subject to controls hereinafter described which may prevent tripping of the hammers by the cam 281.

A separate train of mechanism is provided for actuating the hammer 271, which prints the date and other data from the electroplate 299 on the receipt. This train of mechanism is the same in principle of operation as that for actuating the hammers 270 and 272, described above.

The printing hammer 271 (Fig. 6) is actuated by a cam 269, which cooperates with a lever 268 connected by a link 305 with an arm 306 of one lever of a pair of levers 307 freely mounted on the shaft 273. A bail 308 connects the pair of levers 307 (only one of which is shown) and overlies a shoulder formed on the printing hammer 271. A spring, not shown but like the springs 288 and 292, maintains the shoulder on the printing hammer 271 in contact with the bail 308.

When the cam 269 is rotated clockwise, it actuates the link 305, arm 306 and levers 307 to rock the bail 308 clockwise against the tension of a powerful spring 309, in the same manner that it does the bail 274 associated with the hammers 272 and 270. The hammer 271 is forced by a spring like 288 and 292 to follow the bail 308 in its clockwise movement until the cam 269 passes from beneath the end of the operating lever 268 whereupon the levers 307 and bail 308 are rocked rapidly counter-clockwise by the powerful spring 309. The hammer 271 is thus rocked counter-clockwise to take an impression by platens 310 and 311 carried thereby from the electroplate 299 and date type wheels (not shown) on the receipt strip 137. After the impression is made, the hammer 271 is restored to its normal position by means of its spring in a manner similar to that of the hammers 270 and 272.

The bail 308 (Fig. 6) has formed thereon a flange 312 cooperating with a latch 313 mounted on a rod 314, suitably supported in the printer side frame 131, for the purpose of preventing any rebound movement of the hammer 271 after it has been rocked counter-clockwise to take an impression. A spring 315 normally urges the latch 313 in a clockwise direction so that a hook 316 will embrace a pin 317 carried by the hammer 271 and restrain it against movement out of its normal position. When the hammer 271 is rocked clockwise by the bail 308 and levers 307, preparatory to taking an impression, the flange 312 engages a projection 318 on the latch and rocks the latch counter-clockwise to release the hammer 271 for operation.

*Detail printing hammers*

The impression is made upon the record strip 138 by a platen 325 carried by an impression hammer 324 (Figs. 6 and 8) pivoted on the rod 279. A spring 326 normally holds a stud 327 on the impression hammer 324 against the upper side of an extension 328 of an impression hammer operating lever 329 pivoted on the rod 279. A bail 330 extending between two arms 331 (only one of which is shown) loosely mounted on the rod 279 is provided to actuate the operating lever 329 and the impression hammer 324. The right-hand arm 331 has secured thereto an arm 332 loosely mounted on the rod 279.

The bail 330 underlies an arm 333 of the hammer operating lever 329. A powerful spring 334 is connected to the lever 329 and acts to hold the arm 333 against the bail 330, the bail 330 in turn being limited in its movement by an extension 335 on the arm 331 striking a stationary rod 336 supported by the printer side frame 131. Thus the rod 336 determines the normal position of the lever 329 and bail 330.

When the printer drive shaft 194 is rotated clockwise during an operation of the machine, a lobe 337 on a cam 338 fast to the shaft 194 strikes an edge 339 of the arm 332 and cams the arm 332, bail 330 and lever 329 counter-clockwise. Counter-clockwise movement of the lever 329, through the spring 326, rocks the impression hammer 324 counter-clockwise. When the lobe 337 clears the edge 339 of the arm 332, the lever 329 is rocked rapidly clockwise by the powerful spring 334 until the extension 335 of the arm 332 strikes the stationary rod 336. The quick clockwise movement of the lever 329 is transmitted to the impression hammer 324, and the hammer 324 is carried still further upward by its own momentum, when the lever 329 is stopped by the rod 336. It is during the movement of the hammer 324 after the lever 329 has been stopped that the hammer 324 takes an impression from the lower set of type characters on the printing wheels 155. The movement of the hammer 324 after lever 329 has been stopped is permitted by the stretching of the spring 326. After the impression is taken the spring 326 returns the hammer 324 to its normal position, as shown in Fig. 8.

The cam 338 (Fig. 8), in addition to the lobe 337, is shown as having two other lobes, which lobes are used in giving the hammer 324 two additional actuations during each operation of the machine for the purpose of printing in two different places on an inserted slip. Inasmuch as the inserted slip printing feature forms no part of the present invention, it is unnecessary for the cam 338 to have more than the one lobe 337, which causes a single actuation of the hammer 324 during each operation of the machine to print on the record strip 138.

*Control means for disabling printing hammers*

By means hereinafter described, the hammers 270 and 271 are normally disabled and are so held during adding operations. The hammers 272 and 324 are normally in position to be tripped during adding operations.

Means is provided under control of the total lever 34 for disabling the printing hammers 272 and 324 during the first cycle of either sub-total or grand-total taking operations the other two hammers 270 and 271 remaining normally disabled during such cycles.

Mechanism, amply illustrated and described in the above mentioned Shipley Patent No. 1,865,147, is provided which, under control of the total lever 34 (Fig. 2), causes the machine to operate continuously through two cycles of operation when a sub-total or grand-total is to be taken from a selected totalizer.

Such disabling of all of the printing hammers during the first cycle of either a sub-total or grand-total operation is customary in machines of the type herein referred to, as illustrated and described in the before mentioned Brand Patent No. 1,963,733. It was also customary in such machines to release all of the printing hammers, during the second cycle of such operations, to print on the receipt paper and record strip.

However, the present invention contemplates, in addition to disabling all of the printing hammers during the first cycle of a sub-total operation, also disabling the printing hammers 270 and 271 (Fig. 6) during the second cycle of such sub-total operation, and then releasing said hammers 270 and 271 for operation during the second cycle of a grand-total operation.

The purpose of such an arrangement is to prevent the hammers 270 and 271, which it will be recalled print the consecutive number, date and other special data, from printing on the receipt until after a grand total is printed thereon, immediately after which the receipt is automatically fed out of the machine as previously described.

The means for disabling the hammers consists of a hammer control lever 346 (Figs. 6, 9, 13 and 14), journaled on the largest type carrier sleeve 148, carrying at its lower end a flange 347 and at its upper end a flange 350 having an extension 351, while extending from its right hand side is a projection 356. The flanges 347 and 350, extension 351 and projection 356 on the hammer control lever 346 disable the printing hammers 324, 270, 272 and 271, respectively, when the lever 346 is moved by the total lever 34 to certain of its various positions of adjustment. The manner in which this result is accomplished will now be described.

The flange 347 cooperates with a stud 348 (Fig. 6) on an arm 349 secured to the record strip printing hammer 324 to disable that hammer. The extension 351 (Figs. 13 and 14) on the flange 350 cooperates with a stud 352 projecting laterally from an arm 353 secured to the amount printing hammer 272 for disabling such hammer. The flange 350 cooperates with a stud 354 on an arm 355 secured to the consecutive number and special data printing hammer 270 for disabling this hammer; and the projection 356 contacts a stud 357 on an arm 358 connected by a bail 359 to an upwardly extending arm 360 having a notch 362 adapted to engage a stud 363 on the date and special data printing hammer 271. The projection 356 by contacting the stud 357 holds the arm 360 in the position shown (Fig. 6) against the action of a spring 361 to disable the date and special data printing hammer 271.

The extension 351 which cooperates with the stud 352 on the arm 353 of the amount printing hammer 272 is shorter than the oppositely extending flange 350 cooperating with the stud 354 on the arm 355 of the consecutive number and special data printing hammer 270, the two studs 352 and 354 being spaced apart from each other, and extending laterally toward each other. The hammer control lever 346 extends into the space between the two studs 352 and 354 on the parallel printing hammers 272 and 270, respectively.

When the total lever 34 is in its "add" position (Fig. 2), the hammer control lever 346 is so positioned that the flange 350 cooperates with the stud 354 on the arm 355 of the consecutive number and special data printing hammer 270, and the projection 356 contacts the stud 357 to cause the notch 362 to engage the stud 363 on the date and special data printing hammer 271. The hammers 270 and 271 are thus disabled during adding operations. The purpose of having these hammers thus disabled during adding operations is to prevent printing on the receipt the date, consecutive number and special data, which it is not desired to have printed until after a grand total for the complete transaction is printed on the receipt.

The position which the hammer control lever 346 assumes during adding operations is such that the flange 347 does not cooperate with the stud 348 on the arm 349 secured to the lower or record strip printing hammer 324, nor does the extension 351 on the flange 350 cooperate with the stud 352 on the arm 353 secured to the amount printing hammer 272. It is thus apparent that during adding operations only the amounts will be printed on the record strip 138 and receipt 137 by the hammers 324 and 272, respectively.

The manner in which the total lever 34 controls the hammer control lever 346 will now be described. When the total lever 34 is moved to its "sub-total" position, the slot 203, through the mechanism heretofore described, causes the shaft 214 and shaft 242 to be rocked slightly clockwise. Such movement of the shaft 214 couples the cam disk 229 to the gear 233, thereby preparing the machine for a two cycle operation. Through the flexible drive connections 246 and 247 (Figs. 10 and 11) this slight clockwise movement of the shaft 242 is transmitted to the three-armed lever 197, which, through a stud 404 thereon coacting with a notch 405 formed in the hammer control lever 346, rocks said lever slightly counter-clockwise to disable all of the printing hammers during the first cycle of a sub-total operation.

Near the end of the first cycle of the sub-total operation, the shaft 242, through the cam disk 229 and gear 233, receives a further clockwise movement and, through the three-armed lever 197, rocks the hammer control lever 346 further counter-clockwise to release all of the printing hammers for operation during the second cycle of operation, as is customary in such types of machines.

However, as before mentioned, it is not desired to have the consecutive number and special data printing hammer 270 and the date and special data printing hammer 271 print during sub-total operations. Therefore, the link 379, when rocked toward the left shortly after the beginning of the second cycle of the sub-total operation, as previously described, rocks the lever 375 clockwise. The finger 374 on the lever 375 contacts the stud 373 and rocks the bell crank 372 and lever 197 counter-clockwise, thereby rocking the hammer control lever 346 clockwise to disable the consecutive number and special data printing hammer 270 and the date and special data printing hammer 271 during sub-total operations.

When the three-armed lever 197 is rocked counter-clockwise shortly after the beginning of the second cycle of the sub-total operation, to position the hammer control lever 346 to disable the printing hammers 270 and 271, means is provided for holding the lever 197 in its moved position to prevent premature movement therefrom until the end of the second cycle of the sub-total operation. The hammer control lever 346 is thus prevented from being moved to release the printing hammers 270 and 271 during the second cycle of the sub-total operation.

The means for accomplishing this result consists of a latch 406 (Figs. 6 and 16) pivoted on a stud 407 in the printer side frame 131. When the lever 197 is rocked counter-clockwise shortly after the beginning of the second cycle of a sub-total operation, it is moved slightly beyond its normal position, thereby carrying the stud 404 thereon above a shoulder 408 formed on the latch 406. When this occurs the latch 406 is rocked clockwise by a spring 409 to position the shoulder 408 directly beneath the stud 404, thereby preventing clockwise movement of the lever 197 until the end of the second cycle of a sub-total operation.

Clockwise movement of the latch 406 by the spring 409 is normally prevented by an angularly disposed finger 410 formed on the latch 406 contacting a stud 411 carried by a pitman 412. The pitman 412 is supported at its left-hand end by a stud 413 on the printer side frame 131 projecting through a clearance slot 414 in the pitman. At its opposite end the pitman 412 is slidably mounted on the printer drive shaft 194. A pair of cams 415 and 416 fast on the shaft 194 cooperate with a pair of rollers 417 and 418, respectively, and normally hold the pitman 412 in its normal position. The roller 417 is mounted on the side of the pitman 412, while the roller 418 is carried on a stud 419 mounted near the upper end of a spring-actuated lever 420 pivoted to the pitman 412. The roller 418, through the spring-actuated lever 420, is held in cooperative relationship with the cam 416 at all times. The purpose of the spring-actuated lever 420 is not pertinent to the present invention and therefore its function is not described.

Shortly after the beginning of each cycle of operation of the machine, the cams 415 and 416 shift the pitman 412 to its extreme right-hand position, thereby moving the stud 411 in a horizontal plane. The finger 410 under the action of the spring 409 follows the stud 411 when released by the lever 197.

Since it is only during the second cycle of a sub-total operation that the three-armed lever 197 is rocked counter-clockwise slightly beyond its normal position by the mechanism previously described, it is only at such time that the stud 404 on the lever 197 is moved above the shoulder 408 on the latch 406. Therefore, it is only during the second cycle of a sub-total operation that the shoulder 408 is moved by the spring 409 sufficiently clockwise to position it directly beneath the stud 404 to hold the three-armed lever 197 and its associated parts in their moved position, thereby preventing the printing hammers 270 and 271 from being released for operation during sub-total operations. Near the end of the second cycle of the sub-total operation, the cams 415 and 416 shift the pitman 412 back toward the left to its normal position, whereupon the stud 411 cooperates with the finger 410 to rock the latch 406 counter-clockwise, thereby withdrawing the shoulder 408 from beneath the stud 404 at the end of the operation. The three-armed lever 197 and its associated parts are thus free to be moved clockwise and counter-clockwise during subsequent operations.

When the total lever 34 is moved from its "add" position to its "grand total" position, it positions the hammer control lever 346 to disable all of the printing hammers during the first cycle of such operation in the same manner as during "sub-total" operations. In addition, it positions the cam arm 395 (Fig. 10) so that it will cause the lever 392 to hold the link 379 in its elevated or ineffective position. Therefore, when the three-armed lever 197 is rocked clockwise near the end of the first cycle of a grand total operation, through the cam disk 229 and gear 233, thereby repositioning the hammer control lever 346 to release all of the hammers for operation, the link 379 having been rendered ineffective will have no influence on the same. Thus all of the printing hammers are released to print on the receipt 137 and record strip 138, during the second cycle of a grand total operation, immediately after which the receipt is fed out of the machine.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of record material feeding mechanism; a manipulative device for preparing the machine for sub-total and grand-total taking operations; and means including a member cooperable with the feeding mechanism and means for shifting the member different extents under control of said device for causing said mechanism to feed the record material a different distance during sub-total taking operations from that during grand-total taking operations.

2. In a machine of the class described, the combination of record material feeding mechanism; a total taking control device to control the machine to take grand totals and sub-totals; and means including a member moved different distances under control of said device in grand total and sub-total operations and cooperable with said feeding mechanism to control said feeding mechanism to feed the record material a short distance during sub-total operations and a long distance during grand-total operations.

3. In a machine adapted to make different kinds of total taking operations, the combination of record material feeding means; a total taking control device; and means controlled by said device and variably cooperable with the feeding means in different kinds of total taking operations to cause the record material to be fed different distances during different kinds of total taking operations.

4. In a machine of the class described, the combination of record material feeding mechanism; and means including an element coacting with the feeding mechanism and operable different extents to control the mechanism to feed the record material a certain distance during adding operations, a longer distance during sub-total operations, and a still greater distance during grand total operations.

5. In a machine adapted to print items, sub-totals and grand totals, the combination of record material feeding mechanism adapted to feed the record material a certain distance during adding operations; means for controlling said mechanism to allow said mechanism to feed the record material a predetermined distance during grand-total operations; said means being operable in sub-total operations; and a device jointly cooperable with said means in sub-total operations to modify the control by said means so that said mechanism will feed the record material only a portion of said predetermined distance during sub-total operations.

6. In a machine of the class described, the combination of record material feeding mechanism; a sub-total and grand total control device; means under control of said device for controlling the feeding mechanism during grand total taking operations; said means being operable under control of said device in sub-total taking operations; and mechanism effective during sub-total taking operations and jointly operable with said means to modify the control exercised by said means to control the operation of the feeding mechanism to produce a different feed in sub-total operations from that in grand total operations.

7. In a machine adapted to print different kinds of totals, the combination of record material feeding mechanism; and means operable differently in different kinds of total taking operations and cooperable with the feeding mechanism to cause said feeding mechanism to feed the record material one distance when taking one kind of total and a greater distance when taking another kind of total.

8. In a machine of the class described, the combination of record material feeding mechanism; a total control device; and means intermediate said mechanism and said device and differently cooperable with the feeding mechanism to cause a short feed to be given the record material during sub-total operations and a long feed during grand total operations.

9. In a machine adapted to print sub-totals and grand totals, the combination of record material feeding mechanism; a gear segment for actuating said mechanism; a total control lever settable to control sub-total and grand total operations; and means variously shifted under control of said lever and coacting with the segment to control the extent of movement of said segment to cause said mechanism to feed the record material a short distance during sub-total operations and a long distance during grand total operations.

10. In a machine of the class described, the combination of record material feeding mechanism; a shiftable member; a total control device to control the machine for different kinds of total operations; and means under control of said device for positioning said shiftable member to control said mechanism to feed the record material different distances during different kinds of total taking operations.

11. In a machine adapted to print sub-totals and grand totals, the combination of record material feeding mechanism; a reciprocating member; a cam arm; a total control device adapted to adjust said cam arm; and means intermediate said cam arm and said reciprocating member to render said reciprocating member effective in sub-total operations whereby said member controls the feeding mechanism to feed the record material a different distance during sub-total operations than during grand total operations.

12. In a machine adapted to print items, sub-totals and grand-totals, the combination of record material feeding mechanism operable to feed the material short, intermediate, and greater distances during various operations; a gear segment for actuating said mechanism; a movable member normally cooperating with said segment to cause said mechanism to feed the record material a short distance during adding operations; means for moving said member out of cooperative relation with said segment to cause said mechanism to feed the record material a greater distance during grand total operations; said means also being operable in sub-total operations; and means for returning said member into cooperative relation with said segment during sub-total operations to cause the mechanism to feed the record material an intermediate distance during sub-total operations.

13. In a machine of the class described, the combination of record material feeding mechanism; a gear segment for actuating said mechanism; a movable member normally in cooperative relation with said mechanism; a total control device to control the machine for total and sub-total operations; and means under control of said device for controlling the movement of said member to cause the feeding mechanism to feed the record material a short distance during sub-total operations and a long distance during grand total operations.

14. In a machine adapted to make two-cycle operations to print grand totals and sub-totals, the combination of record material feeding mechanism; a gear segment for actuating said mechanism; operating mechanism for said segment; a movable member normally cooperating with said segment; means for moving said member out of cooperative relation with said segment during the first cycle of a two-cycle grand total operation to allow the segment to actuate said mechanism to feed the record material a long distance during the second cycle of grand total operations; said means also moving the member during the first cycle of a two-cycle sub-total operation; and a device rendered effective during a sub-total operation for automatically returning said member into cooperative relation with said segment during the second cycle of a two-cycle sub-total operation to allow the segment to actuate said mechanism to feed the record material a short distance during said sub-total operation.

15. In a machine operable in two cycle operations to print sub-totals and grand totals, the combination of record material feeding mechanism for feeding the record material different distances depending upon the kind of total printed; a total control device; and means controlled by the device for controlling the extent of the feed of the record material, said means including a reciprocating member which is operable during each cycle of the two-cycle operations and selectively effective to exert a control on the feeding means; and a plurality of members under control of said device and adapted to cooperate with the reciprocating member to control the effectiveness of the same.

16. In a machine adapted to print sub-totals and grand totals, the combination of record material feeding means; an adjustable means cooperating with the feeding means to control the same to feed the record material different distances for different kinds of total operations; a total control device; a reciprocating member having an effective position and an ineffective position; rockable means adapted to be operated by the reciprocating member when the latter is in effective position to control said adjustable means; and a plurality of means under control of said device to determine when the reciprocating member is to be effective to operate said rockable means and when it is to be ineffective.

17. In a machine adapted to print sub-totals and grand totals, the combination of record material feeding means; an adjustable means cooperating with the feeding means to control the same to feed the record material different distances for different kinds of total operation; a total control device; a reciprocating member having an effective position and an ineffective position; rockable means adapted to be operated by the reciprocating member when the latter is in effective position to control said adjustable means; a plurality of means each being normally in an effective position to prevent the reciprocating member from being moved into its effective position; means under control of said device for moving one of said means into an ineffective position during sub-total and grand total operations; and means under control of said device for controlling a second one of said means to be moved into an ineffective position during sub-total taking operations and into its effective position during grand total taking operations.

18. In a machine adapted to print items, sub-total thereof, a tax calculated on such sub-total amount, and a grand total; the combination of record material feeding mechanism; and means variously operated in the different operations and cooperable with the feeding mechanism to cause said feeding mechanism to feed the record material a short distance during item entering operations, a greater distance during sub-total operations, a short distance during the entry of the tax, and the greatest distance during grand total operations.

19. In a machine operable in total taking operations to print sub-totals and grand totals, the combination of special data and amount impression means, means operable to block all of said impression means during the first part of each total taking operation, automatic means to shift said blocking means to render all of the impression means operative during the last part of each total taking operation, and means rendered effective in a sub-total taking operation, and operable after said automatic shift of the blocking means, to shift the blocking means to prevent the operation of the special data impression means during the last part of the sub-total taking operation.

20. In a machine adapted to operate through two cycles in sub-total operations, the combination of special data and amount impression devices, means operable during the first cycle of such operation to block the operation of all the impression devices, means for automatically shifting the blocking means to render all the impression devices operable in the second cycle, and means to shift the blocking means near the beginning of the second cycle of said sub-total operations to a position where it blocks only the special data impression means.

21. In a machine of the class described, the combination of a manipulative device normally in position to control adding operations and settable to a plurality of positions to control sub-total and grand total operations, special data and amount printing hammers, means adjustable under control of the device when it is moved out of its adding position for disabling the special data and amount printing hammers during the initial part of an operation and for automatically rendering them effective during the latter part of such operation, and means controlled by the device when it is in a sub-total position for readjusting the last-named means whereby the special data printing hammers are disabled during the last part of such operation.

22. In a machine of the class described, the combination of special data and amount hammers, means operable to control the operation of said hammers including a control member normally blocking the operation of all the hammers, said control member being shiftable in total printing operations to render all the hammers effective in a grand total printing operation, and means rendered operable in a sub-total printing operation to return the shifted member to a position to block the special data hammers during a sub-total printing operation.

23. In a machine of the class described, the combination of control means normally controlling the machine for adding operations and operable to control the machine for sub-total and grand total operations; record material feeding means; mechanism, rendered operable by the control means, when it has been operated, for controlling the feeding means to eject the record material; and means rendered operable by the control means, when it is operated to control a sub-total operation, to modify the control of said mechanism whereby the ejection of the record material does not occur during sub-total operations.

24. In a machine adapted to print sub-totals and grand totals, the combination of record material feeding mechanism operable to feed record material different distances depending on the kind of total operation being performed; operating mechanism for the feeding mechanism; a control member cooperable with the feeding mechanism to control the different extents of feed of the record material; a total control device; and means controlled by the device for controlling the cooperation of the member and the feeding mechanism, said means including a reciprocating element effective to exert a control on the member during one kind of total operation to cause the feeding mechanism to feed the record material a different distance during said one kind of operation from the distance which it is fed during a total operation in which the element is ineffective.

25. In a machine adapted to print sub-totals and grand totals, the combination of record material feeding mechanism operable to feed record material different distances depending upon the kind of total printed; operating mechanism for the feeding mechanism; a total control device operable to control grand total and sub-total operations; and means controlled by said device for controlling the operation of the feeding mechanism to feed the record material different distances when different kinds of totals are printed, said means including a reciprocating member operable to exert a control on the feeding mechanism and a plurality of members cooperating with said reciprocating member under control of the total control device, to control the effectiveness of the reciprocating member.

26. In a machine adapted for adding and total taking operations, means to control the operation of the machine in grand total and sub-total operations; record material feeding mechanism; a member operated under control of said control means to condition the feeding mechanism for an ejecting operation; and additional means rendered effective by said control means, when it is operable to control a sub-total operation, for giving the member an additional operation to prevent the feeding means from performing an ejecting operation.

JOHN H. GRUVER.